Jan. 7, 1936.  H. J. HORN  2,026,786
HUB CAP MOUNTING
Filed Aug. 3, 1934  2 Sheets-Sheet 2
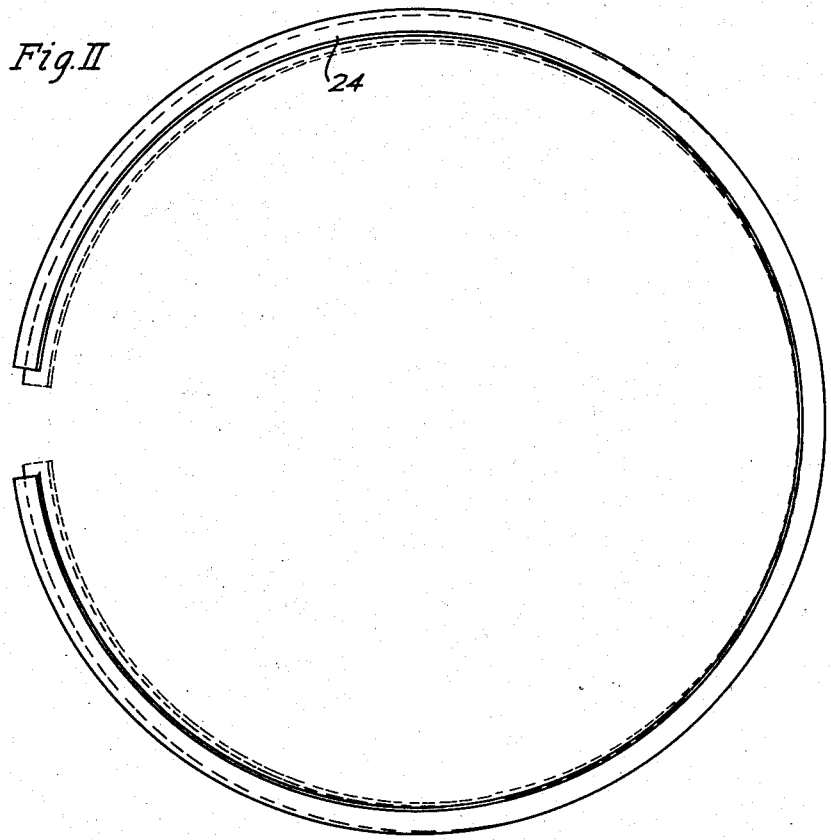
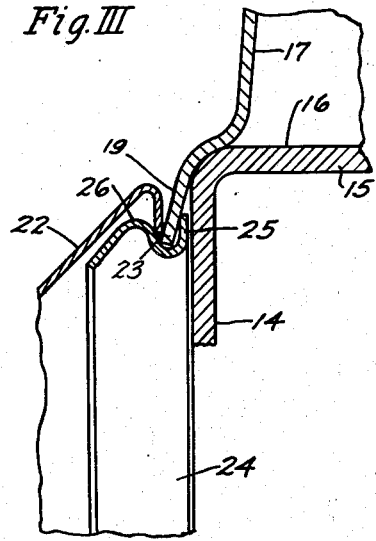
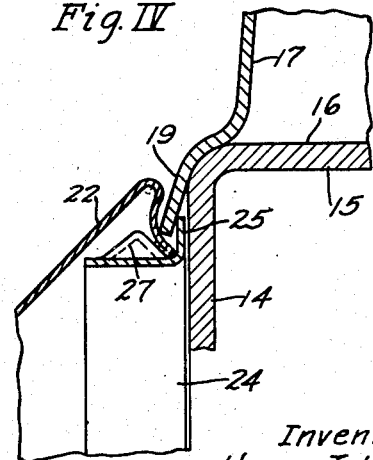
Inventor
Harry J. Horn.
By Carroll R. Taber
His Attorney.

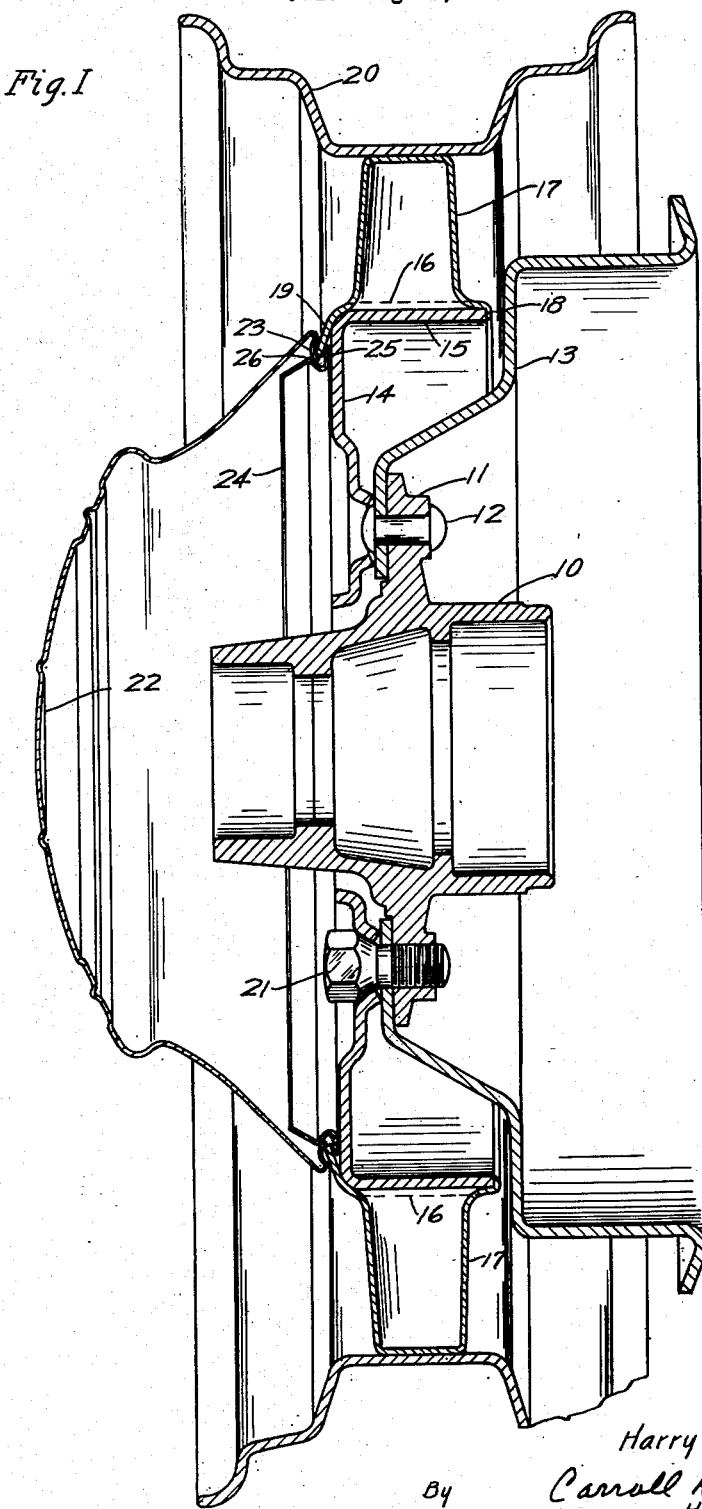
Fig. I

Patented Jan. 7, 1936

2,026,786

UNITED STATES PATENT OFFICE 2,026,786

HUB CAP MOUNTING

Harry J. Horn, Lansing, Mich., assignor to Motor Wheel Corporation, Lansing, Mich., a corporation of Michigan Application August 3, 1934, Serial No. 738,256

8 Claims. (Cl. 301—108)

The present invention relates to wheel constructions and has particular reference to improvements in the mounting of hub caps to wheels of the type commonly used on automobiles, and the like.

A principal object of the invention is the provision of a wheel construction having an improved hub cap mounting structure.

An additional object is to provide a hub cap mounting structure having a resilient attaching element which is not permanently attached either to the hub cap or to the wheel structure.

These and other objects will be apparent from a consideration of the following description and by reference to the accompanying drawings, in which Fig. 1 is a cross-sectional view of a wheel construction made in accordance with my invention;

Fig. 2 is a front view of the split ring employed in the hub cap mounting structure shown in Fig. 1;

Fig. 3 is a fragmentary cross-sectional view of a modified form of the hub cap mounting structure shown in Fig. 1; and Fig. 4 is a fragmentary view of a further modified form of the hub cap mounting structure shown in Fig. 1.

Wheel constructions of the type to which this invention pertains generally include hub, spoke and rim portions. Most wheel constructions also are provided with suitable braking mechanism attached to the hub member. In many cases a disk structure will be employed in the place of or in addition to the spoke members. As it is desirable to protect and to hide from view the hub portion of the wheel, it is customary to employ a hub cap which normally is connected to the wheel by resilient attaching means secured either to the hub cap itself or to the wheel portion. This construction makes it necessary to attach the resilient means to the cap or wheel prior to the completion of their manufacture. Breakage or distortion of the permanently attached resilient members destroys the utility of the cap, due to the difficulty of replacing the damaged part. Damage and distortion of the cap itself makes it necessary to replace the resilient member as well as the cap.

In accordance with my invention the wheel construction is provided with an improved structure for securing the hub cap to the wheel portion. A particular advantage of the improved structure is that the resilient means for securing the hub cap and wheel portions together need not be attached either to the cap or to the wheel portion. It has been my discovery that a particularly desirable hub cap attachment may be had by the use of an independent expansion ring split so that it may be contracted and released in engagement with adjacent attaching portions of the wheel structure and hub cap.

As shown in the drawings, the hub 10 is provided with an annular flange 11 to which is attached by means of rivets 12 a brake drum 13 of conventional construction. The hub flange 11 also has attached to it an inner disk 14 which is composed of a pressed steel plate turned over at its outer edge to form a spoke-supporting annular flange 15. The flange 15 of inner disk 14 forms a support for an outer spoke spider 16 having a plurality of spaced spokes 17 extending therefrom. Spider 16 may be formed by pressing the spokes 17 from a flat strip of metal and then bending the strip into circular formation with the spokes extending radially therefrom. At its rear edge the spider 16 is turned over to form a rear attaching flange 18 for engagement with the rear edge of flange 15 of the inner disk member. At its outer edge the spoke spider 16 is provided with a front flange 19 which extends centrally of the wheel in engagement with the front edge of flange 15 on the inner disk and also extends inwardly a further distance in spaced relation to inner disk 14. The spider 16 may be securely attached to flange 15 as by welding. The outer ends of the spaced spokes 17 constitute a support for a tire rim 20 which is attached to the spoke ends by suitable rivets or by welding.

In order to make the tire-carrying portion of the wheel demountable the inner disk 14 is provided with a series of openings through which extend bolts or lugs 21. These lugs pass through openings in the brake drum 13 and engage threads in flange 11 of the hub member. Ordinarily there will be six of such lugs spaced evenly about the hub portion.

The inwardly extending attaching flange 19 is employed for mounting a hub cap 22 to the wheel portion. The hub cap is provided with an inwardly extending attaching edge 23 which is positioned adjacent the attaching flange 19. An expansion ring 24, which is an annular ring split as shown in Fig. 2, acts to secure edge 23 and flange 19 in releasable engagement. At its rear portion the ring 24 is turned outwardly to form a flange-engaging annular band 25. Spaced from the band 25 is provided a hub cap edge-engaging hump 26. The spaced position of band 25 and hump 26 provides a recess or valley into which is received flange 19 and edge 23 of the hub cap. As the expansion ring 24 has a tendency to increase in diameter the hub cap and wheel portion are held together firmly so as to prevent rattling or accidental release.

In its normal position the expansion ring 24 has a diameter as indicated in the outer drawing of Fig. 2. The ring is manufactured separately from the hub cap and wheel portion and is not attached to either. In assembling the wheel the expansion ring is contracted and snapped into engagement beneath the flange 19. The ring expands into contact with the flange and the hub cap is secured in position by pressing the inwardly extending edge 23 into engagement with hump 26 of the compression ring. This action causes the compression ring to be contracted to an extent sufficient for the edge 23 to snap over the hump or raised portion 26, whereupon the ring 24 expands and presses edge 23 and flange 19 together in a firm manner.

As the hub cap is pressed into engagement with the expansion ring the flange-engaging band 25 of the ring is pressed against the inner disk 14, the latter forming a brace which limits the lateral movement of the expansion ring.

To remove the hub cap from the wheel a sharp instrument such as a screw driver may be inserted between the flange 19 and edge 23 and leverage exerted to move the hub cap outwardly against the expanding action of ring 24 until the edge 23 passes over raised portion 26 of the expansion ring.

The construction of ring 24 is such that the flange-engaging band 25 preferably is of greater diameter than the diameter of the hump 26. Also the inside diameter of the edge 23 is sufficiently large as to permit the edge to pass over hump 26 before the expansion ring is contracted to such an extent that the band 25 will pass beneath the lower edge of flange 19.

In the modification shown in Fig. 3 the inner edge 23 of the hub cap is of greater diameter than the inner diameter of flange 19, the hump 26 is of greater diameter than the inner diameters of flange 19 and edge 23, and the flange-engaging band 25 is of greater diameter than the diameter of raised portion 26 and the inside diameters of flange 19 and edge 23. Therefore, the hub cap may be pressed over hump 26 without the necessity of providing the backing structure formed by inner disk 14. Also, the hub cap may be withdrawn without releasing the expansion ring from engagement with the flange 19.

In the modification shown in Fig. 4 the ring 24 is provided with a series of spaced humps 27 about its outer portion rather than the continuous annular hump 26 shown in Figs. 1 and 3. These spaced humps act in the same manner as described with respect to the continuous humps 26 and may be found preferably in certain cases where the amount of contact with the hub cap is desirably less.

In each of the embodiments shown in the drawings, the ring 24 has a greater expansibility than that permitted by the attaching flange of the wheel portion and the attaching edge of the hub cap, and the expansion ring also has a smaller possible diameter than that permitted by these members when in final assembled position, whereby to provide a separate resilient means for releasably securing the hub cap to the wheel portion.

The structure described herein is susceptible of other modifications without departing from the scope of the invention. The split expansion ring forms a releasable connection between the hub cap and the wheel portion. The flange 19 of the wheel portion need not be of the particular shape shown, nor need it be continuous about the wheel. It is sufficient that a supporting means is provided for the expansion ring 24 and this requirement may be complied with by structure different from that specifically shown and described. Also, the particular shape of the attaching edge 23 of the hub cap is susceptible of change, as is the shape of the attaching ring. The wheel portion need not have the particular structure shown. It may be entirely a disk wheel or a wood spoke wheel or a wire wheel. In the drawings, the spokes are shown as being pressed from the material of an annular spoke spider, although it will be understood that other spoke arrangements may be employed. All such changes and modifications are intended to be included in the appended claims.

I claim:

1. In a wheel construction, a central portion having an inwardly extending flange, a split resilient ring having a valley for receipt of said flange and a raised portion on the outside of said flange, and a hub cap having an inwardly extending flange for engagement with said raised portion.

2. In a wheel construction, a wheel member having an inwardly extending annular flange, a hub cap having an inwardly extending annular attaching edge of a diameter greater than the diameter of said flange, and a split expansion ring having two spaced raised portions for resiliently holding said flange and said edge together.

3. In a wheel construction, a wheel member having an inwardly extending annular flange and a bracing portion spaced from said flange, a hub cap having an inwardly extending annular attaching edge, and an expansion ring resiliently holding said flange and said edge together, said ring having an inner securing portion positioned between said flange and said bracing portion and an outer snap portion for engagement with the attaching edge of said hub cap.

4. In a wheel construction, a wheel portion having an annular attaching flange, a hub cap having an annular attaching edge, and a resilient split ring engaging opposite sides of said flange and said edge to form a demountable connection between said edge and said flange.

5. In a wheel construction, a wheel portion having an inwardly extending attaching flange, a hub cap having an inwardly extending attaching edge of greater inside dimension than the inside dimension of said flange, and an expansion ring holding said edge and said flange together, said ring having an edge-engaging raised portion adapted to be compressed beneath the attaching edge of said hub cap and a flange-engaging raised portion of greater diameter than the diameter of said flange when said ring is compressed beneath the attaching edge of said hub cap.

6. In a wheel construction, a wheel portion having an inwardly extending attaching flange, a hub cap having an inwardly extending attaching edge, and an expansion ring holding said edge and said flange together in releasable engagement, said ring having an edge-engaging raised portion adapted to be compressed beneath the attaching edge of said hub cap and a flange-engaging raised portion of greater diameter than the diameter of said flange when said edge-engaging portion is compressed beneath the attaching edge of said hub cap.

7. In a wheel construction, a wheel portion having an inwardly extending attaching flange, a hub cap having an inwardly extending attaching edge, and a separate split expansion ring holding said edge and said flange together in releasable engagement, said ring having a flange-engaging raised portion and a plurality of edge-engaging raised portions spaced about its outer surface.

8. The combination with a vehicle wheel having a radially extending attaching portion and a hub cap having a radially extending attaching portion of means detachably connecting the hub cap to the wheel comprising a ring provided with axially spaced portions adapted to engage the opposite faces of said radially extending wheel and hub cap attaching portions.

HARRY J. HORN.